United States Patent
Brandl et al.

(10) Patent No.: US 6,250,447 B1
(45) Date of Patent: Jun. 26, 2001

(54) HYDRAULIC OPERATING SYSTEM, PARTICULARLY FOR A MOTORCYCLE BRAKE AND/OR CLUTCH

(75) Inventors: Raimund Brandl, Landau; Hans-Guenter Peters, Wolnzach, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/353,117

(22) Filed: Jul. 14, 1999

(30) Foreign Application Priority Data

Jul. 14, 1998 (DE) .............................................. 198 31 527

(51) Int. Cl.⁷ .............................. F16D 19/00; F16D 25/00
(52) U.S. Cl. ........................................ 192/85 R; 188/352
(58) Field of Search ............................ 192/85 C; 60/578, 60/589, 591, 584; 188/352

(56) References Cited

U.S. PATENT DOCUMENTS

| 4,456,099 | * | 6/1984 | Kawaguchi | 188/71.6 |
| 4,474,272 | | 10/1984 | Emlie | 188/352 |
| 4,479,511 | | 10/1984 | Holland | 137/614.2 |
| 4,557,361 | * | 12/1985 | Nix et al. | 192/85 C |
| 4,560,049 | * | 12/1985 | Uchibaba et al. | 192/85 R |
| 4,785,629 | | 11/1988 | Ennis, III et al. | 60/584 |
| 4,793,663 | * | 12/1988 | Ocvirk et al. | 303/110 |
| 4,911,276 | * | 3/1990 | Leigh-Monstevens et al. | 192/84 |
| 5,647,213 | * | 7/1997 | Kaub et al. | 60/578 |
| 5,690,046 | * | 11/1997 | Grzech, Jr. | 114/270 |

FOREIGN PATENT DOCUMENTS

| 3216885A1 | 11/1983 | (DE) . |
| 3935353A1 | 4/1991 | (DE) . |
| 0430835A1 | 6/1991 | (EP) . |

OTHER PUBLICATIONS

European Search Report, Nov. 2, 1999.

* cited by examiner

Primary Examiner—Rodney H. Bonck
Assistant Examiner—Tisha D. Lewis
(74) Attorney, Agent, or Firm—Crowell & Moring, L.L.P.

(57) ABSTRACT

A hydraulic operating system for a vehicle brake and/or clutch, in which a filler connection piece is situated in the area of a hydraulic piston. In this manner, the hydraulic fluid is not charged as in the prior art by way of a compensating tank of the system but directly by way of the hydraulic cylinder assigned to the wheel brake and/or the vehicle clutch. This permits a charging of the system which is advantageous with respect to the assembly, causes little contamination and avoids air pockets.

17 Claims, 1 Drawing Sheet

HYDRAULIC OPERATING SYSTEM, PARTICULARLY FOR A MOTORCYCLE BRAKE AND/OR CLUTCH

BACKGROUND AND SUMMARY OF THE INVENTION

This application claims the priority of German patent 198 31 527, filed Jul. 14, 1998, the disclosure of which is expressly incorporated by reference herein.

The invention relates to a hydraulic operating system for the brake and/or the clutch of a vehicle, particularly a motorcycle, having an operating element for acting upon a hydraulic cylinder, which is assigned to the brake and/or the clutch, and having a compensating tank for the hydraulic fluid.

The charging of such operating systems with hydraulic fluid takes place in many cases by way of the compensating tank of the hydraulic circulation system. As a rule, a return flow bore is also provided at this point so that the hydraulic fluid can flow unhindered from the compensating tank back to the operating cylinder. This arrangement results in the disadvantage that, during the charging—which, as a rule, takes place in a vacuum—air pockets may form in the pipe system.

In the case of known motorcycles, the compensating tank is part of the hand brake and clutch system on the motorcycle handle bar. This leads to additional disadvantages. Thus, the charging can take place only in a certain handle bar position or alignment of the compensating tank. Furthermore, the cover of the compensating tank must be unscrewed before the charging operation and must then be fastened again. Because of the vacuum filling, a large surface of the opened compensating tank must be sealed off by the filling device before the charging operation. On the whole, contaminations of the handle bar fittings by the hydraulic fluid must nevertheless be expected.

It is an object of the invention to provide an apparatus for charging an operating system of the above-mentioned type, in the case of which air pockets can be largely avoided and which can be handled without any problems.

According to the invention, this and other objects have been achieved by providing a hydraulic operating system for at least one of a brake and a clutch of a vehicle, comprising: a compensating tank containing hydraulic fluid; a hydraulic cylinder which is assigned to said at least one of a brake and a clutch, said hydraulic cylinder communicating with said compensating tank; a filler connection piece provided at the hydraulic cylinder for charging the hydraulic cylinder with hydraulic fluid; and an operating element for acting upon said hydraulic cylinder.

According to the invention, this and other objects have been achieved by providing a hydraulic operating system for one of a brake and a clutch of a vehicle, comprising: a hydraulic cylinder communicating with said one of a brake and a clutch; and a filler connection piece provided at the hydraulic cylinder for charging the hydraulic cylinder with hydraulic fluid.

According to the invention, this and other objects have been achieved by providing a method of making a hydraulic cylinder for one of a brake and a clutch of a vehicle which can be directly charged with hydraulic fluid, comprising: providing a filler connection piece at the hydraulic cylinder, said filler connection piece containing a return valve which can be opened by a filling device.

According to the invention, the charging therefore no longer takes place by way of the compensating tank but by way of a filler connection piece which is provided on the hydraulic cylinder assigned to the clutch or the brake.

Generally, as the result of the invention, the pipe system is charged at a point which is away from the return flow bore of the compensating tank. During the charging operation, the air still present in the pipes is therefore pushed to the bleed opening by the afterflowing hydraulic fluid. Air pockets therefore do not occur or occur far less.

The filler connection piece is expediently designed such that a filling device can be placed securely in a precise position and the filling opening can be opened up by it. For the first measure, the filler connection piece has a guide groove on its outer circumference; for the second measure, the filling opening is closed by a return valve which is opened up, for example, by a mandrel of the filling device.

Furthermore, it is advantageous to use, in addition to a return valve, a gland (i.e., seal) for closing the filling opening. As a result, it is ensured that, in the event of an unintentional lifting-off of the valve body, for example, in the case of vibrations, or in the event of a misuse, no hydraulic fluid can flow to the outside.

By way of the filler connection piece, the hydraulic circulation system can also be bled. For this purpose, a bleeder valve must only be screwed into the filling bore of the filler connection piece. If applicable, a gland (i.e., seal) must first be removed which is situated there.

In a particularly advantageous manner, the invention is suitable for motorcycles, in the case of which the compensating tank is part of the hand brake and clutch system fastened to the handle bar. Here, the filler connection piece is either screwed into the caliper or assigned to the clutch operating cylinder. In many cases, a bleed nipple is provided here anyhow. As a result of the invention, this bleed nipple is only replaced by the filler connection piece. A new constructive design of the concerned component, the caliper or the clutch operating cylinder is not necessary in these cases.

Furthermore, the invention permits a charging which is advantageous with respect to the assembly. Its position is independent of the compensating tank, and a contamination by emerging hydraulic fluid is largely prevented. The filling cross-section, which is relatively small in comparison to the compensating tank, permits an improvement of the system evacuation. Finally the charging quantity can be proportioned more precisely.

Other objects, advantages and novel features of the present invention will become apparent from the following detailed description of the invention when considered in conjunction with the accompanying drawings.

DETAILED DESCRIPTION OF THE DRAWINGS

Figures 1, 2, 3:
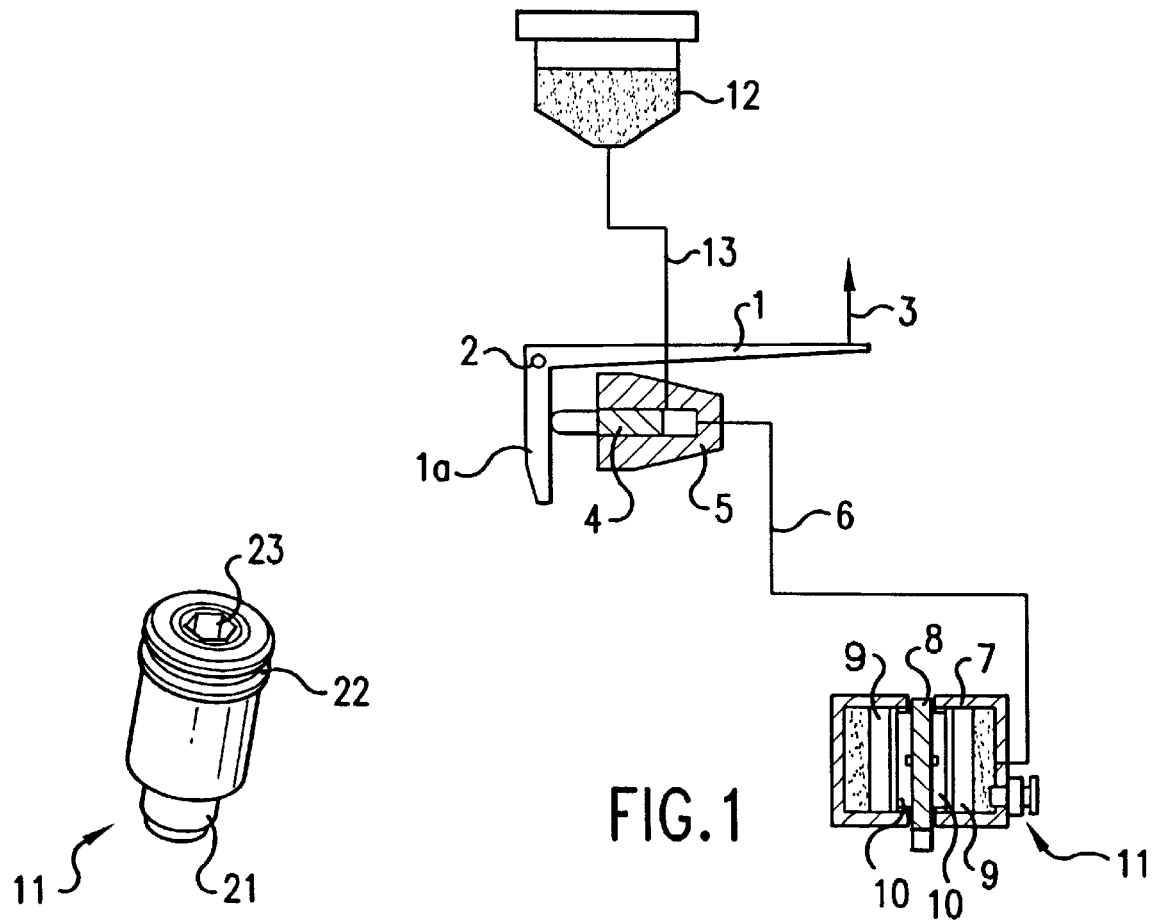
FIG. 1 is a schematic view of a brake system for a motorcycle according to a preferred embodiment of the present invention.
FIG. 2 is an enlarged and perspective view of a filler connection piece.
FIG. 3 is a further enlarged partially sectional view of the filler connection piece of FIG. 2.

FIG. 1 illustrates the components of a brake system of a motorcycle which are most important for understanding the invention. The motorcycle itself is not shown but a bent hand brake lever 1 can be recognized which, swivellably in a pivot 2, is disposed on the handle bar, which is also not shown, of the motorcycle. When the hand brake lever 1 is pulled in the direction of an arrow 3, its bent end 1a presses on a displaceable piston 4 of an operating cylinder 5. In this case, it presses brake fluid by way of a line 6 into an hydraulic cylinder 7, which is part of a caliper, which is not shown in detail, of a disk brake.

By means of two partial cylinders, the hydraulic cylinder 7 reaches around a brake disk 8, and pistons 9 are displaceably guided in each partial cylinder. By way of the pistons 9, the brake fluid presses the brake linings 10 against the friction surfaces of the brake disk 8. Finally, the hydraulic cylinder 7 has a filler connection piece 11 on a partial cylinder, which filler connection piece 11 permits an access from the outside to the brake circuit.

A compensating tank 12 supplies the operating cylinder 5 by way of a line 13 with brake fluid. In this case, the compensating tank is in reality fastened to the handle bar of the motor cycle.

FIGS. 2 and 3 indicate the details of the filler connection piece. The sectional view according to FIG. 3 shows a multiply stepped passage bore with a first bore section 14 which has an expanded diameter, points to the outside and is used as a filling opening. This bore section 14 is adjoined by a collar 15 which points radially to the inside and changes, in turn, into a bore section 16 with a slightly larger diameter. By way of a step, which is designed as a stop shoulder 17, the passage bore changes into a last narrower bore section 18 which leads into the brake circuit of the hydraulic cylinder 7.

The bore section 16 accommodates a pressure spring 19, one end of which is supported on the stop shoulder 17 and the other end of which presses a valve plate 20 against the interior side of the collar 15. The valve plate 20, the pressure spring 19 and the collar 15 together therefore form a return valve which can be opened up toward the inside in the direction of the brake circuit.

In the area of the narrower bore section 18, the filler connection piece 11 has an external thread 21 by way of which it is screwed into the hydraulic cylinder 7. Finally, on the opposite side of the filler connection piece, a surrounding guide groove 22 is formed out also on the exterior side, for the positioning of a filling device 24.

When the brake circuit is charged, as mentioned above, a filling device 24 is placed on the filler connection piece 11 and a mandrel 25 provided in the filling device opens up the valve plate 20. The brake circuit is then evacuated and is then charged with brake fluid. After the filling device 24 is removed, the filler connection piece remains in the hydraulic cylinder 7. However, for the securing, a gland (i.e., seal) 23 (see FIG. 2) is screwed into the filling opening (bore section 14) of the filler connection piece.

During a later bleeding of the brake circuit, for example, during a stay in a shop, the gland (i.e., seal) 23 is removed again and a bleeder valve 24 is screwed in instead, which, in turn, opens up the valve plate 20. The bleeding operation then takes place in the generally known manner.

While the foregoing description has been based on a hydraulic brake system, the description and drawings may also be considered to correspond to a hydraulic clutch system. In that case, FIG. 1 illustrates the components of a clutch system of a motorcycle, including a compensating tank 12 with clutch fluid, a bent hand clutch lever 1, and a hydraulic clutch cylinder 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hydraulic operating system for at least one of a brake and a clutch of a vehicle, comprising:

a compensating tank containing hydraulic fluid;

a hydraulic cylinder which is assigned to said at least one of a brake and a clutch, said hydraulic cylinder communicating with said compensating tank via a hydraulic line;

a filler connection piece separate from the hydraulic line and provided at the hydraulic cylinder for charging the hydraulic cylinder with hydraulic fluid; and an operating element for acting upon said hydraulic cylinder.

2. Hydraulic operating system according to claim 1, wherein said vehicle is a motorcycle.

3. Hydraulic operating system according to claim 1, wherein said operating element comprises an operating cylinder and a piston.

4. Hydraulic operating system according to claim 1, wherein the filler connection piece contains a return valve which can be opened by a filling device.

5. Hydraulic operating system according to claim 1, wherein the filler connection piece defines a guide groove on an outer circumference, said guide groove being configured to engage with a filling device.

6. Hydraulic operating system according to claim 4, wherein the filler connection piece defines a guide groove on an outer circumference, said guide groove being configured to engage with said filling device.

7. Hydraulic operating system according to claim 1, wherein the filler connection piece has a filling opening which can be closed by a seal.

8. Hydraulic operating system according to claim 1, wherein the filler connection piece permits the hydraulic fluid to be bled from said hydraulic cylinder.

9. Hydraulic operating system according to claim 7, wherein the filler connection piece is configured to receive a bleeder valve, after the removal of the seal.

10. Hydraulic operating system according to claim 1, wherein said hydraulic cylinder is part of a hydraulic brake system for a motorcycle, said compensating tank containing brake fluid, said operating element including a brake lever on a handle bar of the motorcycle and coupled to said operating element, said hydraulic cylinder being a wheel brake cylinder, wherein when the brake lever is operated said piston acts on the brake fluid in said wheel brake cylinder.

11. Hydraulic operating system according to claim 10, wherein the wheel brake cylinder is integrated in a caliper of a disk brake and the filler connection piece is fastened in the caliper.

12. Hydraulic operating system according to claim 1, wherein said hydraulic cylinder is part of a hydraulic clutch system for a motorcycle, said compensating tank containing clutch fluid, said operating element including a clutch lever on a handle bar of the motorcycle and coupled to said operating element, said hydraulic cylinder being a clutch operating cylinder, wherein when the clutch lever is operated said piston acts on the clutch fluid in said clutch operating cylinder.

13. Hydraulic operating system for one of a brake and a clutch of a vehicle, comprising:

a hydraulic cylinder communicating with said one of a brake and a clutch and receiving pressure via a hydraulic line; and a filler connection piece separate from the hydraulic line and provided at the hydraulic cylinder for charging the hydraulic cylinder with hydraulic fluid.

14. Hydraulic operating system according to claim 13, wherein the filler connection piece contains a return valve which can be opened by a filling device.

15. Hydraulic operating system according to claim 13, wherein the filler connection piece defines a guide groove on an outer circumference, said guide groove being configured to engage with a filling device.

16. Hydraulic operating system according to claim 14, wherein the filler connection piece defines a guide groove on an outer circumference, said guide groove being configured to engage with said filling device.

17. Hydraulic operating system according to claim 13, wherein the filler connection piece permits the hydraulic fluid to be bled from said hydraulic cylinder.

* * * * *